Nov. 18, 1958    H. C. HILL    2,860,932
SLIPPER THRUST BEARING
Filed Oct. 8, 1956

INVENTOR.
HENRY C. HILL
BY
Reynolds, Beach & Christensen
ATTORNEYS

United States Patent Office 2,860,932
Patented Nov. 18, 1958

2,860,932

SLIPPER THRUST BEARING

Henry C. Hill, Seattle, Wash., assignor to Boeing Airplane Company, Seattle, Wash., a corporation of Delaware Application October 8, 1956, Serial No. 614,589

8 Claims. (Cl. 308—73)

Slipper bearings of the Michell tilting pad type have been used in radial or journal bearings, and have been modified to afford free floating segmental slipper blocks not pivotally connected to a ring or common support. Such slipper journal bearings are relatively simple and inexpensive to make and assemble, do not require close tolerances or working clearances, and have more dependable action and longer life, all as compared to roller or ball bearings for like duty. I have discovered, in working with floating sleeve bearings, and radial slipper type bearings, that their greater clearance enables them to compensate automatically for some dynamic unbalance in the rotor, which in turn lessens the bearing loads, eliminates the destructive high frequency vibration and reduces the cost of balancing the mechanism of which the rotor is a part.

Since most high speed rotors, and particularly gas turbine rotors, are subjected to thrust loads from the forces acting on the compressors therein, the full beneficial effect of floating bearings is not realized unless the thrust bearing has radial freedom, as well as the radial journal bearings. Such float cannot be achieved with ball thrust bearings because the action of the thrust load on the ball races causes any initial radial clearance to be completely taken up.

There is therefore an urgent need for an end thrust bearing capable of supporting end thrust of high speed rotors, and at the same time allowing radial float of the rotor shaft, for instance, the rotors in a gas turbine engine rotating at a speed of many thousands of revolutions per minute, and developing end thrust from centrifugal or axial-flow compressors or turbine wheels. Further there is a need for thrust bearings of greater load capacity at high speed than currently available ball bearings. Premature failure of such a gas turbine, used for example in aircraft propulsion, or in a turbine driven alternator on an aircraft, could be extremely disastrous, yet unaccountable and premature failures in such mechanisms incorporating ball or roller bearings have occurred.

Radial load journal sleeve and slipper bearings function as they do because there is clearance between the load-bearing surfaces or pads of the slippers and the mating surfaces of the shaft or of the bearing housing, in which clearance space an oil film becomes pressurized by the dynamic forces active thereon, so that the slipper pads tilt and float on the oil film. This effect is heightened by affording to the pad surfaces a curvature that differs slightly from the curvature of the mating surfaces. This permits each slipper to tilt as though about an axis parallel to the axis of rotation, and the clearance spaces assume somewhat of a wedge shape, as the dynamic lubricant film builds up pressure therein. Since the satisfactory action of the radial load slipper bearings depends upon such tilting action of the individual slipper blocks, it was attempted to afford tilting movement to floating slipper blocks for axial or end thrust bearings, by beveling off at least one end of each face of the slipper pad. It was found, however, that such bearings failed quickly and erratically, and scored the bearing surfaces.

After many extended and expensive experiments, I have found that a major cause of failure was that the beveling had been along radial lines, and that such floating slipper end thrust bearings could operate successfully only if the trailing end of one slipper end face and the trailing end of the opposite end face, were parallel, directed almost diametrally of the shaft but spaced at opposite sides of a radial plane through the axis of rotation. In consequence, the slipper tends to tilt about a line parallel to the line of bevel, and does not cock but bears evenly all along the line of bevel, yet floats. It is primarily the discovery of the necessity for forming the trailing edges of the slippers as parallel lines, in order to make their use practical in end thrust bearings, whereon patent protection is claimed herein. Another important feature is the relative positions of the two bearing faces or pads of the slipper.

The present slipper thrust bearing constitutes in effect two Michell or Kingsbury thrust pads placed back to back, with their pivots relatively so located that both pads tilt in unison, the supporting pivot of one pad being the center of oil film pressure of the other pad (as will be explained below), and vice versa, distinguished by the fact that the slippers float freely and by the orientation of the ends of the pads, especially their trailing ends, in parallelism.

The lubricant film, collecting in the clearance between each slipper pad and the mating surface of its adjacent shoulder, becomes pressurized during rotation. The center of pressure for any such clearance space should be located in a slipper journal bearing and in a slipper thrust bearing with fixed pivot at about 40% of the pad length ahead of the trailing end of the pad, according to the teachings of Michell (Lubrication, A. G. M. Michell, Blackie and Sons, London, England, 1950) and of others, principally Kingsbury, in order to obtain the highest load-carrying capacity and the lowest friction drag. There is no experience to guide in the location of centers of pressure in a floating slipper end thrust bearing, which comprises two oppositely facing pads upon the respective end faces of a common slipper block, but by locating the respective centers of pressure at the 40% location, excellent results were obtained. However, it was discovered that such 40% locations for the two pads obtained optimum results only when, by proper location of the two pads with relation to one another, the center of pressure of the one pad is located substantially directly opposite the center of pressure of the opposite pad. The manner in which this is accomplished will be explained hereinafter, and this relative location of the centers of pressure constitutes a novel feature of this invention, which it is intended to claim.

The invention will be best understood as this specification progresses and the drawings forming part of this specification illustrate diagrammatically a representative form of the invention, but not the only form thereof. Primarily, the drawing is for the purpose of illustrating the principles of the invention which, when understood, can be incorporated in various forms of execution. The features which are novel and which are believed to be my discovery or invention are expressed in the claims.

Figure 1:
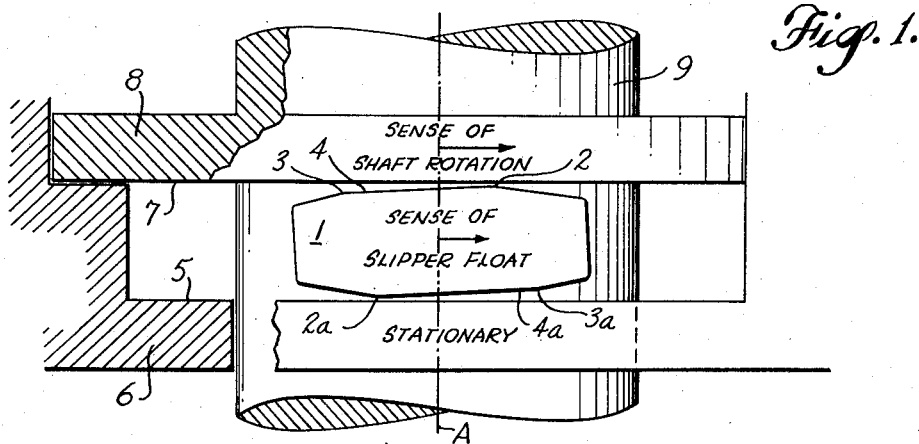
Figure 1 is an elevational view illustrating a single slipper block in operative relationship to a shoulder upon a shaft and a facing shoulder upon a fixed housing, illustrating the principles of the slipper thrust bearing, but without any attempt to show a practicable form of the invention.

The rotative shaft 9 is shown as integral in effect with a flange or collar 8, one end face 7 whereof defines a shoulder for transmitting or receiving end thrust. The housing 6 is formed with a similar facing shoulder 5 which receives end thrust from the shoulder 7 through the medium of the slipper thrust bearing, which is about to be described. Naturally, in the diagrammatic showing the manner of mounting the flange or collar 8 upon the shaft is not disclosed, nor are any practicable details shown to permit assembly of the bearing. Such details are in themselves known in the art and have been omitted here for simplicity of illustration.

The shaft, its collar 8, and the housing are so designed as to afford an annular space intermediate the shoulders 7 and 5, within which is installed a ring of segmental bearing blocks 1. The clearances allowed are such as will permit some tilting of each slipper block relative to the shoulders, without metal-to-metal contact. These slipper blocks 1 are preferably not positively connected to each other, although an impositive connection, such as a garter spring 13 or the like, is permissible. Thereby each block may tilt independently of all others, yet the entire ring of blocks can be handled as a unit and the blocks will necessarily follow each other in succession around the shaft as the shaft turns.

Figure 2:
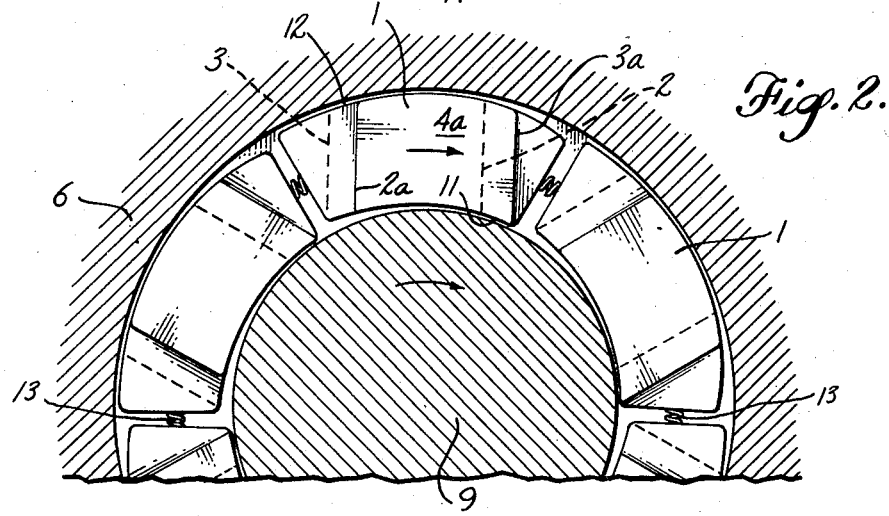
Figure 2 is a view of a ring of bearing slippers in operative relationship to a shaft and the housing, primarily to illustrate the disposition of the opposite pads of each block and illustrating incidentally the possibility of employing the same slipper blocks as radial or journal bearing elements as well as end thrust bearing elements.

The slipper bearing blocks are intended to float about the shaft in the same sense of rotation, but at a lesser speed, by reason of the accumulation and dynamic force of the lubricant film between the mating surfaces of the block and of the shoulders 5 and 7, respectively, and it has been attempted to show the sense or rotation of the shaft and the absolute sense in which the slipper floats, by the arrows in Figures 1 and 2, and to show their relative speeds by the relative sizes of the arrows.

With relation to the slipper block, the shoulder 7 of the shaft moves in the sense of its arrow, wherefore, as between the shoulder 7 and the adjoining end face of the slipper 1, there is a leading end and a trailing end. At the trailing end, the end face of the block is beveled off along a line 2, and it is preferable also to bevel off the leading edge of the same end face of the block along a line 3, to leave a pad 4 which is, in effect, the bearing surface, although it is held from metal-to-metal contact with the shoulder 7 by the intervening lubricant film. Turning to the opposite end face of the same slipper, since this floats in the sense indicated by the arrow and the shoulder 5 is stationary, this opposite end face has also a leading end and a trailing end, and it is beveled off, as indicated at 2a, at the trailing end and at 3a at the leading end, to leave the bearing pad 4a which cooperates with the shoulder 5.

The block tilts about the two edges 2 and 2a as the shaft rotates, and builds up a pressurized wedge of oil in the space between the pad 4 and the shoulder 7, and between the pad 4a and the shoulder 5. If the lines 2 and 2a were not parallel, but each were radial, as they were when the slipper thrust bearing was first unsuccessfully tested, any tilting about the line 2 would cock the line 2a with relation to the plane of the shoulder 5 and, conversely, any tilting about the line 2a would cock the line 2 with respect to the plane of the shoulder 7, so that the block would be unstable and would tend to score along the corner at the end of the line 2 or 2a which is urged into the corresponding shoulder. When the lines 2 and 2a are parallel, there can be no such cocking of the block, but rather the block tends to bear evenly along each of the lines 2 and 2a, and along each entire line, although, of course, the lubricant film passes between these lines and the respective shoulders.

These lines 2 and 2a are more or less diametrally directed, although actually they are chords close to but at opposite sides of a radial plane through the axis of rotation at A.

Figure 3:
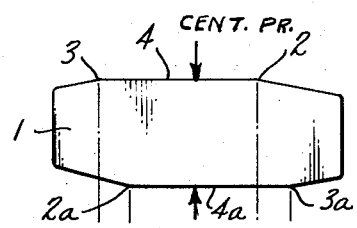
Figure 3 is an edge view of a single slipper block, according to the present invention.
Figure 4:
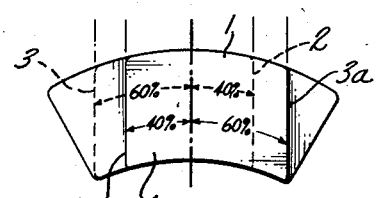
Figure 4 is a related face view of the same block.

Tilting of the block is accomplished by virtue of the generation, under the influence of the pressurized oil in the wedge-shaped spaces between the pads and their respective shoulders, of a couple which tends to tilt the slipper. For best results, it has been found that the two pads must be correctly located with respect to each other. I have found that the two centers of pressure of the oil films should be opposite one another, or nearly so. It is this which dictates the relative offset lengthwise of the two pads. Since the center of pressure of each oil film is approximately 60% of the pad length from the leading edge of the pad surface, by offsetting the pads so that the trailing edge of each is about 20% of the pad length back from the leading edge of the other pad, the centers of pressures of the two pads will be opposite, as shown in Figures 3 and 4.

It is possible to form such slipper blocks to support radial thrust as well as end thrust; thus, in Figure 2, the internal circumference 11 of the block is of slightly greater radius than the corresponding peripheral surface of the shaft 9, and the outer surface 12 of the pad is of slightly less radius than the corresponding peripheral surface of the stationary portion of the bearing. This permits the pad to tilt about an axially directed axis, as it were, relative to the rotative shaft and the stationary bearing, and as described above with relation to the end thrust bearing, there is in the radial thrust bearing two cooperating wedges of pressurized lubricant, which effects tilting of the slipper blocks to the desired extent.

The emphasis hereinabove has been on high speed bearings and the floating slipper end thrust bearing described is better suited to high speed bearings than any other known type, yet it will function well at lower speeds. Its superiority at high speeds arises from its ability to support the loads with no more frictional drag than conventional bearings, without regard to the shaft and bearing race size, coupled with its freeing of the shaft to seek its dynamic balance about an axis of rotation, thereby eliminating high frequency vibration from unbalance. The significance of the invention in making possible a thrust bearing with floating slipper blocks, will be realized from the fact that the double radial clearances thus provided considerably augment the ability of a high speed rotor shaft to run on its true balance center. The floating thrust bearing therefore eliminates radial bearing loads caused by balance errors in the rotor and also the vibration which these bearing loads cause.

I claim as my invention:

1. An end thrust slipper bearing comprising a plurality of free-floating slipper blocks arranged end to end in a circle, and each of like thickness between parallel planar faces, said opposite faces of said slipper blocks being beveled at the respectively opposite ends of the block along lines parallel to each other and chordally disposed close to but at opposite sides of a plane through the axis of such circle at the midpoint in the slipper block's length, and so arranged in use that the beveled ends trail with respect to the contiguous axially facing slipper block, in the intended sense of rotation, for tilting about such lines.

2. A slipper end thrust bearing as in claim 1, wherein the leading end of each slipper block end face is beveled, along a line parallel to the lines at the trailing ends.

3. A slipper end thrust bearing as in claim 2, wherein the respective end faces are offset towards respectively opposite sides of the slipper block's longitudinal midpoint, with the leading end line of bevel farther from such midpoint than the trailing end.

4. An end thrust bearing comprising a plurality of free-floating slipper blocks, each having opposite planar faces, and each of a length to complete a segment of a circle, and in the aggregate defining a complete circle, said slipper blocks being each capable of tilting about an effective axis radial to the circle, independently of the others, the respective faces of each slipper block being relieved along parallel lines at those ends which trail with respect to its intended sense of rotational movement, said faces being offset circumferentially so that each beveled trailing end underlies in part the opposite planar face.

5. The combination of claim 4, including a garter spring connecting the several slipper blocks and yieldable for tilting of each independently of the others.

6. The combination of claim 4, wherein the support has a bearing track concentric with the shaft and surrounding the slipper blocks, and each slipper block is formed with outer and inner radial load bearing surfaces, the outer of which has an arc slightly less in radius than the outer periphery of the circle as a whole and the inner of which has an arc slightly more in radius than the inner periphery of such circle.

7. In combination with a shouldered rotative shaft and a stationary support formed with a shoulder facing and spaced axially from the shaft's shoulder by a given distance, an end thrust bearing comprising a plurality of free-floating slipper blocks disposed end to end between the shoulders and in the aggregate completely encircling the shaft, each block being of a thickness less than the distance between said shoulders, each slipper block being beveled at its trailing end, with respect to the intended sense of rotation, along lines parallel to each other and chordally disposed close to but at opposite sides of a plane through the axis of rotation of the shaft at the midpoint in the length of the slipper block, for tilting about such lines as axes, each slipper block independently of the others, to the extent permitted by the excess spacing and an intervening lubricant film.

8. The combination of claim 7, including a stationary bearing surface surrounding the circle of slipper blocks, concentric with and at a spacing from the shaft in excess of the radial thickness of said slipper blocks, each slipper block being formed with an outer radial load bearing surface of an arc slightly less in radius than said surrounding bearing surface, and with an inner radial load bearing surface of an arc slightly more in radius than the shaft's bearing radius.

References Cited in the file of this patent

UNITED STATES PATENTS 2,076,254    Shebat  ---------------- Apr. 6, 1937

FOREIGN PATENTS 43,243    Norway  -------------- Oct. 18, 1926